United States Patent [19]

Koike et al.

[11] Patent Number: 4,772,818
[45] Date of Patent: Sep. 20, 1988

[54] CATHODE RAY TUBE WITH PIGMENT-DOPED PHOSPHOR

[75] Inventors: Norio Koike; Takeo Itou; Hidemi Matsuda, all of, Fukaya; Mitsuhiro Oikawa, Yokohama, all of Japan

[73] Assignee: Kabushiki Kaisha Toshiba, Kawasaki, Japan

[21] Appl. No.: 921,270

[22] Filed: Oct. 21, 1986

[30] Foreign Application Priority Data

Oct. 21, 1985 [JP] Japan ........................... 60-233330
Nov. 6, 1985 [JP] Japan ........................... 60-246969

[51] Int. Cl.$^4$ ........................... H01J 29/20
[52] U.S. Cl. ................... 313/467; 252/301.6 F; 252/301.65; 252/301.4 F; 313/468
[58] Field of Search ............ 313/467, 461, 463, 468, 313/469, 486, 487; 252/301.4 R, 301.4 S, 301.4 P, 301.4 F, 301.6 R, 301.6 S, 301.6 P, 301.6 F; 428/403

[56] References Cited

U.S. PATENT DOCUMENTS

| | | | |
|---|---|---|---|
| 4,116,864 | 9/1978 | Kagami et al. | 313/467 |
| 4,172,920 | 10/1979 | Kanda et al. | 252/301.6 R |
| 4,510,414 | 4/1985 | Fujino et al. | 313/468 |
| 4,559,469 | 12/1985 | Welker et al. | 313/468 |

FOREIGN PATENT DOCUMENTS

| | | | |
|---|---|---|---|
| 0090851 | 6/1982 | Japan | 313/467 |
| 0151943 | 8/1985 | Japan | 313/467 |
| 2136195 | 9/1984 | United Kingdom | 313/468 |
| 0860170 | 8/1981 | U.S.S.R. | 313/468 |

OTHER PUBLICATIONS

European Search Report–EP 86 30 8123.

Primary Examiner—David K. Moore
Assistant Examiner—Mark R. Powell
Attorney, Agent, or Firm—Oblon, Fisher, Spivak, McClelland & Maier

[57] ABSTRACT

In a cathode ray tube with a phosphor screen containing a Zn type green emitting phosphor, e.g. ZnS, ZnCdS and $Zn_2SiO_4$, the surface of the phosphor particle includes a surface area of $(Co,Zn)O$. The surface area is green colored to operate as a filter against incident light from outside the tube and reduces background brightness of picture images caused by excitation of scattering electrons. Thus, the contrast of the picture images rises. The contrast is further increased by Ni doped.

12 Claims, 5 Drawing Sheets

CATHODE RAY TUBE WITH PIGMENT-DOPED PHOSPHOR

BACKGROUND OF THE INVENTION

This invention relates to a cathode ray tube, more particularly to the phosphor screen thereof.

In general, a color cathode ray tube is provided with a phosphor screen constituted by a stripe- or dot-arranged phosphor pattern emitting red, green and blue respectively, which is coated on the inside of an envelope panel. The screen is excited to emit the light by three electron beams generated from an electron gun.

In order to improve the contrast of the picture images on the screen, it has been known to reduce the reflectivity of the phosphor screen by means of pigmented phosphor.

As a green emitting phosphor for the color cathode ray tube, zinc type phosphors, e.g. ZnS:CuAl, (ZnS:CuAl—ZnS:AuAl), ZnS:CuAuAl, (Zn,Cd)S:CuAl are conventionally used. These sulfide phosphors have a relatively high efficiency to give a high brightness to the tube. The phosphors emit light by a subtle electron excitation as scattering electrons. Thus, such emission raises the background brightness of the picture, so the contrast ratio deteriorates. The use of a pigmented phosphor is one of the methods for improving the contract. The pigmented phosphor is a mixture of phosphor particles and colored pigment particles.

In the Japanese Patent Publication No. 58-27832, chromium oxide green, cobalt green and $TiO_2$—ZnO—CoO—NiO are disclosed as suitable green pigments. The role of the pigment is to reduce the reflectivity of the phosphor surface, while not reducing the background brightness caused by scattering electrons. This is believed to be because these pigment particles with relatively small sizes are physically attached on the surface of the phosphor particles. The pigments cause a lowering of the phosphor luminescence efficiency, which is the ratio of an anode applied voltage to the value of brightness. In addition, the pigments cannot selectively prevent scattering electrons with various potentials from exciting the phosphor. This applicant has filed the Japanese applications (Japanese Patent Disclosure Nos. 60-156787, 60-199091 and 60-199092) disclosing methods of improving the degradation of picture image contrast caused by scattering electrons. These methods include doping a small amount of nickel, cobalt and iron ions into the green emitting zinc sulfide phospor particle surface as a killer to improve the contrast.

In particular, cobalt doping controls the voltage-brightness characteristics of the phosphor and nickel doping controls the current-brightness characteristics thereof. The above-mentioned disclosures describe reducing the effect of scattering electrons using both characteristics. Table 1 shows the characteristics of ZnS:CuAl phosphors with no doped, Co doped, Ni doped and Co—Ni double doped, respectively.

The double doped phosphor is made by firing with Co: 10 ppm and Ni: 0.75 ppm at the same time at 700° C. for 45 min.

As shown Table 1, the green monochromatic brightness and background brightness of a phosphor screen assembled in a 20 inch type color cathode ray tube were measured. The screen using the double doped green phosphor, as compared with the other phosphors, showed a synergistic effect from Co and Ni doping in relation to the background brightness, but not to the green brightness. The green brightness tended to reduce unpractically.

TABLE 1

| phosphor | green brightness (relative value) (beam current 1.6 $\mu A/cm^2$) | background brightness (relative value) |
|---|---|---|
| no doped | 100 | 100 |
| Co:10 ppm doped | 95 | 85 |
| Ni:0.75 ppm doped | 100 | 90 |
| Co,Ni double doped | 88 | 76 |

Since Ni ion is easily diffused into the ZnS inner core in the presence of Co ions during firing, the luminescence efficiency is lowered. In Table 1, the background brightness was measured at a region less than 30 mm from the edge of the white window pattern while the screen was covered by a black paper. An area with 30 cm × 10 cm was displayed at the upper half of the screen with an anode voltage of 26.0 kv and total beam current of 500 $\mu A$.

SUMMARY OF THE INVENTION

An object of the invention is to provide a cathode ray tube with a phosphor screen having a combination of low background brightness and high green brightness.

According to the invention, the cathode ray tube comprises at least one panel housing a phosphor screen containing greeen emitting phosphor and an electron gun for generating an electron beam aligned for exciting the phosphor screen. The phosphor inclludes particles each having a doped surface area containing (Co,Zn)O as a main component. The doped surface area is formed by chemically combining cobalt oxide with the surface of phosphor particles containing zinc as a parent material. The doped area may cover only a part or the entire particle surface. The area is green colored to reduce the reflectivity of the phosphor, in addition to providing the effect on the dead voltage. The amount of cobalt oxide in the doped surface area is about 0.005 wt% to about 1.0 wt%, and, more preferably, about 0.01 wt% to about 0.41 wt% in terms of a cobalt atom value based on a phosphor particle of 100 wt%. Cobalt oxide below 0.005 wt% has less effect in reducing background brightness and cobalt oxide over 1.0 wt% markedly lowers green brightness.

In the invention, further, nickel doping on the surface of the phosphor particle improves the level of the background brightness. An amount of nickel ion doped in the doped surface area and the other surface portions is preferably in the range of about 0.1 ppm to 5 ppm. An amount below 0.1 ppm has less effect on the background brightness, and an amount more than 5 ppm saturates the effect on the background brightness and unnecessarily lowers emitting luminescence. A more preferably range of nickel doped is about 0.3 ppm to about 3 ppm.

The phosphor applied to the phosphor screen in the cathode ray tube according to the invention may be a zinc type phosphor containing zinc in the particle, e.g. ZnS, ZnCdS, $Zn_2SiO_4$ or a mixture thereof. As the green emitting phosphor, copper and aluminum activated zinc sulfide (ZnS:CuAl), copper, gold and aluminum activated zinc sulfide (ZnS:CuAuAl), copper and chlorine activated zinc sulfide (ZnS:CuCl), copper and aluminum activated zinc cadmium sulfide (ZnCdS:CuAl), manganese activated zinc silicate ($Zn_2SiO_4$:Mn) and manganese and arsenic activated zinc silicate ($Zn_2SiO_4$:MnAs) are of practical use.

Alternatively the green emitting phosphor may be a mixture of the zinc type phosphor and a non-zinc type phosphor, such as terbium activated yttrium oxysulfide ($Y_2O_2S$:Tb) without zinc as a parent material.

The phosphor may be manufactured by the steps of: covering the raw phosphor particle by a layer of hydroxide, carbonate or oxalic acid of cobalt, and firing the particles. When covering the particle, the zinc compound may be mixed.

BRIEF DESCRIPTION OF THE INVENTION

FIG. 1 is a schematic cross sectional view of an embodiment of a color cathode ray tube according to the invention, FIG. 2 is a schematic enlarged cross sectional view of a phosphor particle according to the invention, FIG. 3 is a graph showing the brightness voltage dependence for the phosphor screen of the embodiment, FIG. 4 is a graph showing the Ni ion amount in the phosphor screen of the embodiment vs. background brightness, FIG. 5 is a graph showing the brightness vs. current density for Ni doped phosphors of the embodiment, and FIG. 6 is a graph showing each of background brightness and relative brightness when Co and Ni ion are double doped within the phosphor to compare the invention and the prior art.

DETAILED DESCRIPTION OF THE PREFERRED EMBODIMENT

FIG. 1 shows a color cathode ray tube which is an embodiment of the invention. There is an evacuated envelope 10 of glass comprising a rectangular shaped panel 11, a funnel 12 extended from the periphery of panel 11 and a neck 13 connected to the tapered top of funnel 12. Inside panel 11 phosphors emitting red, green and blue, respectively, are provided in a striped pattern to form a phosphor screen 14. A shadow mask 15 with a large number of apertures 16 is assembled close to and facing phosphor screen 14, and an inline type electron gun 17 is housed within neck 13. Three electron beams 18 generated from electron gun 17 impinge on phosphor screen 14 through apertures 16 to excite phosphor screen 14.

In this embodiment, copper and aluminum activated zinc sulfide (ZnS:CuAl) phosphor is used as the green emitting phosphor. As shown in FIG. 2, at least a part of the surface 21 of a phosphor particle 20 includes green colored surface areas 22 in which a main component is cobalt-zinc oxide (Co,Zn)O.

In particular, cobalt oxide is combined with particle surface 21 in forming (Co,Zn)O. The amount of cobalt oxide on surface 21 of particle 20 is in the range from about 0.005 wt% to about 1.0 wt%, in terms of Co atoms, based on a phosphor particle of 100 wt%.

As shown in FIG. 3, the range of the cobalt oxide on the surface area is subject to restrictions related to the brightness where the amount is less than 0.005 wt%, the background brightness shows no improvement, and if it is more than 1.0 wt%, though the background brightness is improved, green brightness in the tube operation range is reduced by an unacceptable amount. A preferable range of cobalt is about 0.01 wt% to about 0.41 wt%. FIG. 3 shows the relation of variable applied voltages and the relative brightness assuming the brightness of cobalt oxide free phosphor to be 100, with cobalt amount as a parameter.

The content of zinc in the surface area of (Co,Zn)O is about 0.2 to about 5 times the content of cobalt by mol ratio.

The surface area of (Co,Zn)O appears green and operates as a green color filter. In addition, a part of the cobalt on the phosphor particle surface works as a killer, since brightness reduces at a low voltage, which is the electron scattering area shown in FIG. 3. Consequently, since at least a part of the surface of the phosphor particle comprises the doped surface area of (Co,Zn)O, the phosphor screen has green emitting phosphors which include filter absorbing properties and insensibility to scattering electrons.

It is desired that phosphors according to the invention be not only the ZnS:CuAl, but also the other Zn type phosphors, e.g. ZnS:CuAuAl, ZnS:CuCl, ZnCdS:CuAl, $Zn_2SiO_4$:Mn and $Zn_2SiO_4$:MnAs.

Mixed Zn type phosphor with non-Zn type phosphor also is easily used as the green emitting phosphor in the phosphor screen according to the invention. To form a (Co,Zn)O green layer on a particle of the non-Zn type phosphor, a zinc component is supplied into the layer during manufacturing.

According to the invention, doped nickel into the phosphor particle surface further gives the improvement of the current saturation. The described content of nickel ion is in the range of about 0.1 to about 5 ppm.

Figure 1:
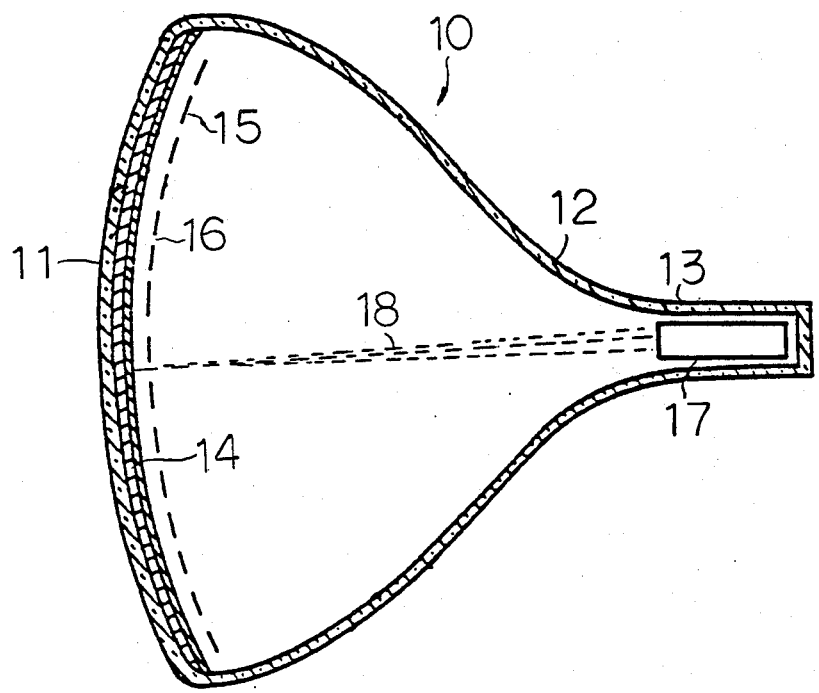
Figure 2:
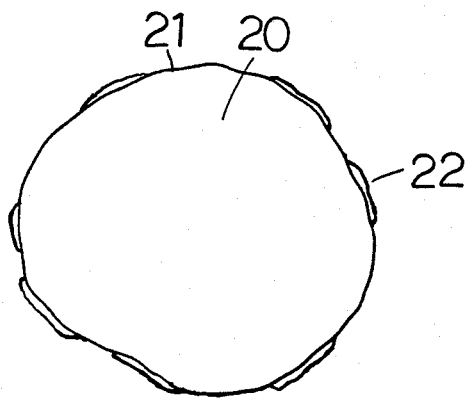
Figure 3:
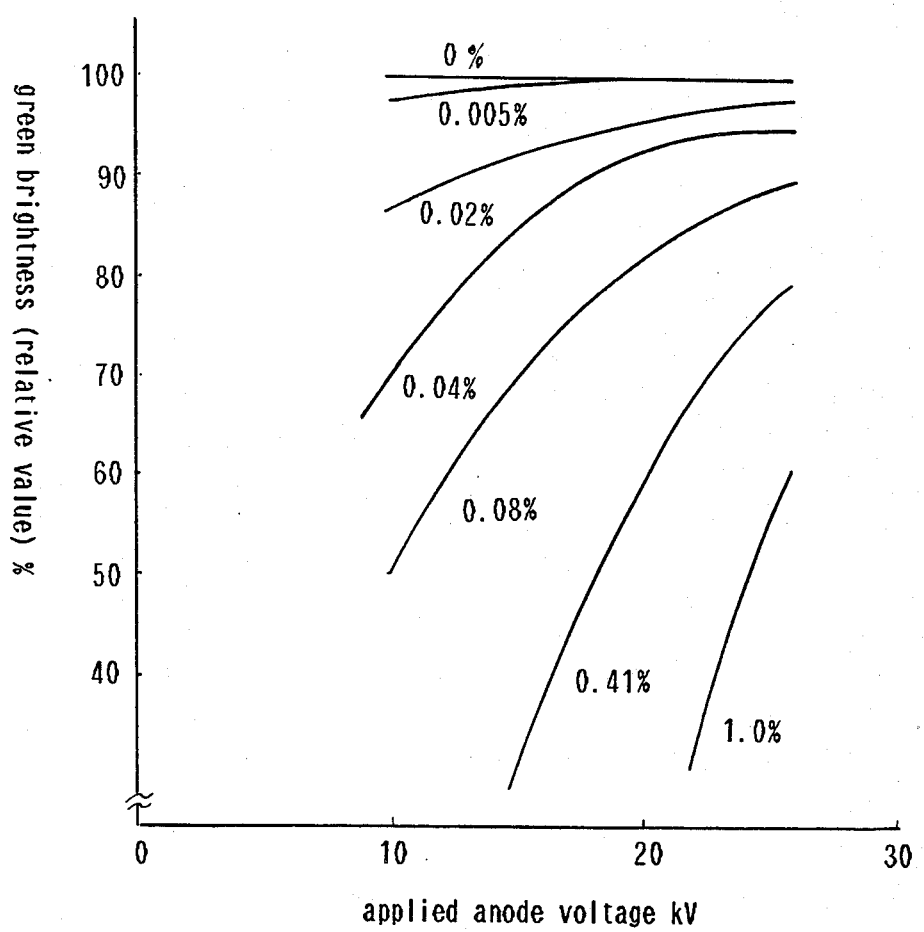
Figure 4:
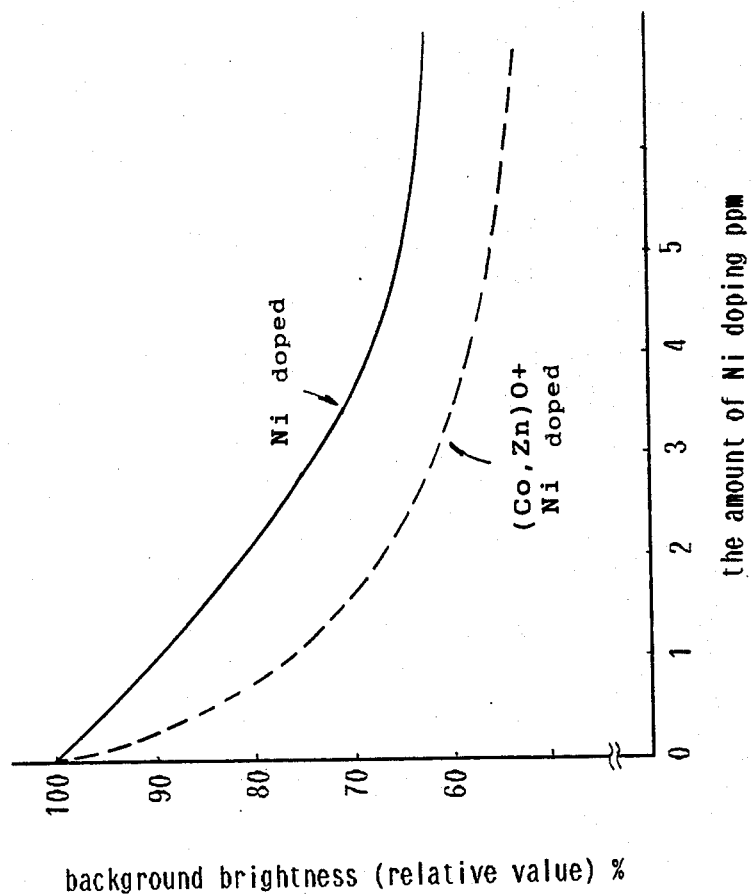
FIG. 4 shows the relation of the nickel ion amount and the background brightness for a non-cobalt ZnS:CuAl and a ZnS:CuAl with a surface area containing (Co,Zn)O of 0.04 wt%.
Figure 5:
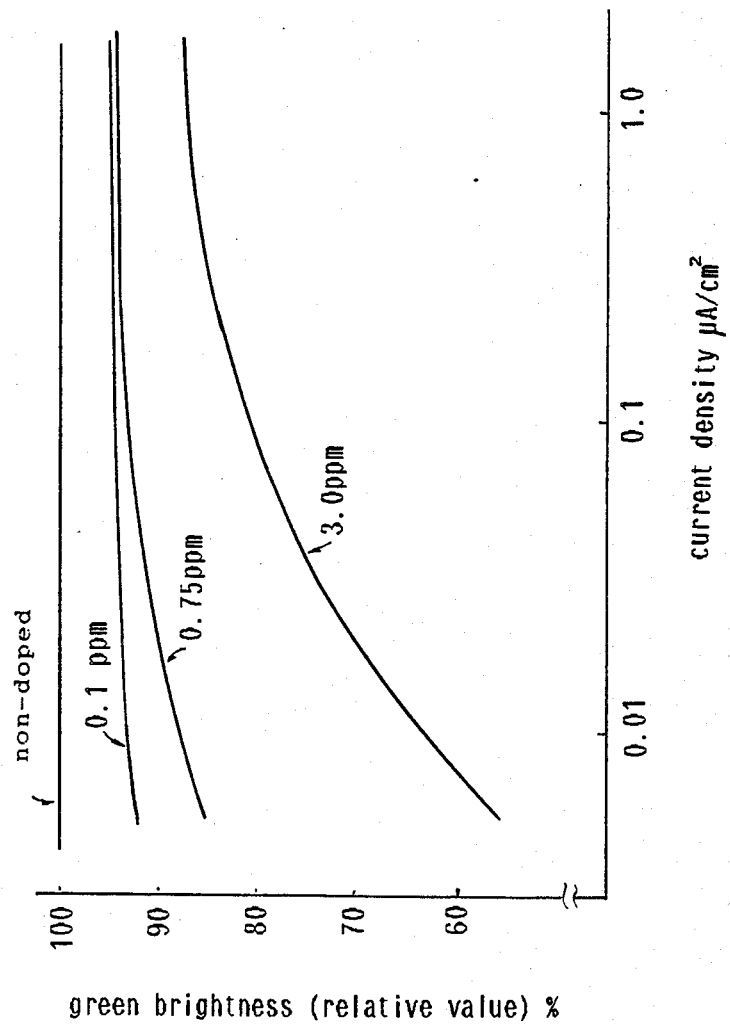
FIG. 5 shows the brightness-current dependence of the phosphor with 0.04 wt% of Co. Both figures show that the higher the density of nickel ion, the lower the brightness in the small current beam, the background brightness.
Figure 6:
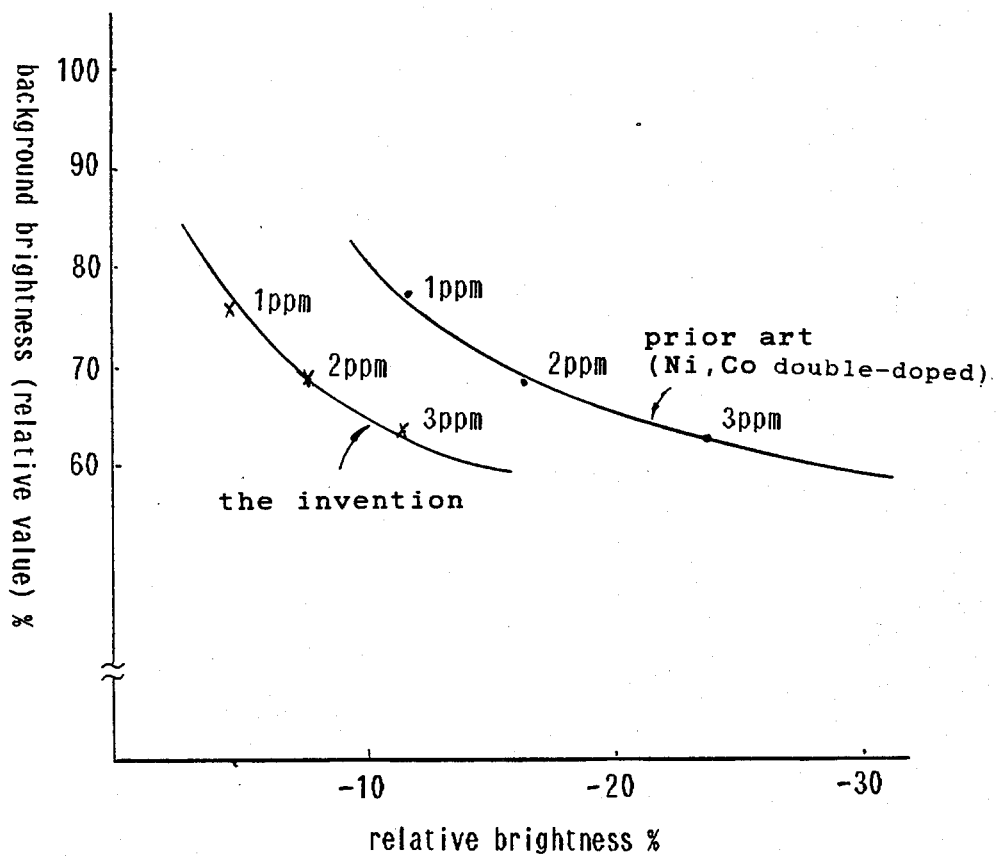

Though the brightness-current dependence hardly changes if Ni doping density is below 0.01 ppm, the reduction of the background brightness becomes saturated if Ni doping density is over 5 ppm. Also, since the brightness in a large current area markedly reduces, such phosphor is not practically useful. It is more preferable that the density of Ni ion be about 0.3 to about 3 ppm. The same relation is applied to the other Zn type phosphors.

In Table 2, both characteristics of the embodiments of the invention and the prior art are compared.

TABLE 2

|  | green brightness (relative value) | background brightness (relative value) | reflectivity (relative value) |
|---|---|---|---|
| (A) prior art 1 | 100 | 100 | 100 |
| (B) prior art 2 | 80 | 86 | 95 |
| (C) prior art 3 | 85 | 76 | 100 |
| (D) prior art 4 | 94 | 75 | 100 |
| (E) prior art 5 | 88 | 76 | 100 |
| (F) embodiment | 90 | 79 | 93 |
| (G) embodiment | 95 | 76 | 95 |

Although the phosphor screens provided in cathode ray tubes (A) to (G) all use ZnS:CuAl phosphors in common, the following characteristics further describe the phosphors of the corresponding letters in the Table:
- (A): phosphor without Co and Ni (prior art),
- (B): pigmented phosphor the surface of which includes 1.0 wt% of cobalt green particles (prior art),
- (C): phosphor doped with 15 ppm of Co ions on its surface (prior art),
- (D): phosphor doped with 3 ppm of Ni ions on its surface (prior art),
- (E): phosphor double doped with 10 ppm of Co ions and 0.75 ppm of Ni ions on its surface (prior art),
- (F): phosphor with surface areas of (Co,Zn)O as a main component, the amount being, in terms of a Co atom value, 0.08 wt% based on phosphor particles of 100 wt% (embodiment),
- (G): phosphor containing 0.75 ppm of doped Ni ion on the surface and with a doped surface area of (Co,Zn)O as a main component, the amount being, in terms of Co atoms, 0.04 wt% based on phosphor particles of 100 wt% (embodiment).

The conditions of measurement are 1.6 $\mu A/cm^2$ for the current density of the electron beam and 26.0 kV for the anode voltage.

In view of Table 2, it is clear that the embodiments (F) and (G) of the invention have better contrast characteristics than those of the prior arts (A) to (E). That is, the characteristics of the embodiment (F) is improved by about 2% in reflectivity, about 13% in green brightness and about 9% in background brightness as compared with the prior art (B).

The embodiment (G) is also improved by the same degree in background brightness, by about 8% in green brightness and by about 5% in reflectivity.

The following describes preparation techniques used in making a number of samples for testing the results of which are shown in Tables, below.

(Embodiment 1)

A commercially produced ZnS:CuAl rawphosphor was prepared by the steps of: mixing proper amounts of zinc sulfide, solution of copper sulfate, a solution of aluminum nitrate and flux of alkali halide, respectively, and drying, firing and ball milling the mixture. Next, the ZnS:CuAl phosphor of 100 wt% and cobalt chloride, $CoCl_2.6H_2O$, of $1.62 \times 10^{-1}$ wt% were mixed, in a slurry, and aqueous ammonia was added to adjust the pH to 8.5, thereby depositing a cobalt hydroxide layer on the phosphor particle surfaces. Next, the phosphor was washed with deionized water, filtered and dried, and fired at 700° c. for 30 min. to form green surface areas combined with cobalt oxide on the phosphor particle surfaces. The amount of cobalt oxide in the surface area had a Co atom value of 0.04 wt% based on the phosphor particle of 100 wt%.

A green emitting phosphor was used together with a blue emitting phosphor of ZnS:Ag and a red emitting phosphor of $Y_2O_2S:Eu$, for the phosphor screen of the color cathode ray tube. The phosphor screen thus constructed, a shadow mask, an inner-shield and an electron gun were assembled in an evacuated envelope to form a color cathode ray tube.

The brightness and reflectivity of the resulting phosphor screen were measured. The results are presented in Table 3. In this embodiment, though the green brightness and the background brightness were the same as those of the Co doped type (prior art), the reflectivity was relatively low. This may be attributable to the effect of the green surface area of the phosphor particle surface.

(Embodiment 2)

Except for the amount of cobalt chloride, the materials and manufacturing method of this embodiment were the same as Embodiment 1, described above. In this embodiment the amount of cobalt chloride was selected to $2.03 \times 10^{-2}$ wt%.

As a result, the surface area of (Co,Zn)O produced on the phosphor particle had cobalt oxide, in terms of Co atoms, of 0.005 wt% based on the phosphor particle of 100 wt%.

(Embodiment 3)

The core phosphor of 100 wt% obtained by the same method described in Embodiment 1 was mixed with cobalt nitrate, $Co(NO_3)_2.6H_2O$, of $1.98 \times 10^{-1}$ wt% in a slurry. Next, $0.97 \times 10^{-1}$ wt% of sodium carbonate anhydride $Na_2CO_3$ was added and the slurry was stirred for 30 min., while kept at 90° C. The particle surface of the resulting phosphor was covered by cobalt carbonate, $CoCO_3$. When the phosphor was fired at 800° C. for 60 min., the particle surface of the phosphor became green. The green surface areas thus obtained had 0.04 wt% of cobalt oxide.

A color cathode ray tube was made with a phosphor screen patterned by the green emitting phosphor, blue emitting phosphor of ZnS:Ag and red emitting phosphor of $Y_2O_2S:Eu$. The brightness and background brightness of the tube were evaluated, with the results shown in Table 3.

(Embodiment 4)

First, as phosphor, ZnS:CuAl, of 100 wt% and cobalt sulfate, $CoSO_4.7H_2O$, of $1.90 \times 10^{-1}$ wt% were mixed in a slurry. Next, $0.97 \times 10^{-1}$ wt% of ammonium oxalate, $C_2O_4(NH_4)_2.H_2O$, was added to the mixture, and a cobalt oxalate layer was formed on the particle surface of the phosphor.

Next, the phosphor was washed with deionized water, filtered, dried and fired at 600° C. for 120 min., This chemically combined phosphor with green colored surface areas with cobalt oxide on the phosphor particle surface. The amount of cobalt oxide in the surface area had a Co atom value of 0.04 wt% based on a phosphor particle of 100 wt%.

Using the green emitting phosphor, and ZnS:Ag and $Y_2O_2S:Eu$ phosphor, a phosphor screen in a color cathode ray tube was formed. The screen was evaluated as shown in Table 3.

(Embodiment 5)

A phosphor, ZnS:CuAl, of 100 wt% and cobalt chloride, $CoCl_2.6H_2O$, of $1.62 \times 10^{-1}$ wt% were prepared and mixed in a slurry. To the slurry, zinc sulfate, $ZnSO_4.7H_2O$, of 1.6 wt% was added and stirred, and aqueous ammonia was added to adjust the slurry to pH 8.5. This resulted in a phosphor covered by a layer of cobalt hydroxide and zinc hydroxide on the surface.

Next, the phosphor was washed with deionzied water, filtered, dried and fired at 700° C. for 90 min. This caused green colored surface areas to chemically combine on the particle surface. The amount of cobalt oxide contained in the surface area had a Co atom value of 0.04 wt% based on a phosphor particle of 100 wt%.

Using the green emitting phosphor, a phosphor screen was formed on a panel with the other phosphors, i.e. ZnS:Ag and $y_2O_2S$:Eu phosphors. The results of tests on this screen are presented in Table 3.

(Embodiments 6 to 8)

As with Embodiments 1 to 5, ZnS:CuAuAl, ZnS:CuAl, (Zn,Cd)S:CuAl phosphors each were formed with a surface area containing cobalt oxide. The results of tests using screens containing these phosphors are shown in Table 3.

(Embodiment 9)

A commercially produced phosphor $Y_2O_2S$:Tb containing no Co was prepared by mixing, in a proper amount, yttrium oxide, terbium oxide and sodium sulfide; firing the mixture in a crystal crucible at 1200° c. for 5 hours, and ball milling the fired material. Next, $Y_2O_2S$:Tb of 100 wt%, cobalt chloride of 0.162 wt% and zinc sulfate of 1 wt% were mixed with water to form a slurry, the pH was adjusted to 8.5 by adding aqueous ammonia, and a layer of cobalt hydroxide and zinc hydroxide formed on the phosphor particles. The raw phosphor was washed, dried and fired at 700° c. for 90 min. to form a layer of (Co,Zn)O on a part of the phosphor particles. The amount of cobalt oxide in the layer had a Co atom value of 0.04 wt% based on a phosphor particle of 100 wt%. This phosphor was mixed with Zn type phosphor, i.e. the ZnS:CuAl obtained in Embodiment 1 in the ratio 1:1. The mixed phosphor was used for the green emitting phosphor of a phosphor screen to evaluate the characteristics of the screen. In order to form the (Co,Zn)O layer on the particle surface of the non-Zn type phosphor, zinc compound was added during the manufacture of the phosphor.

Table 3 shows that this embodiment has good characteristics relating to the green brightness, background brightness and reflectivity compared to comparisons 1 and 2 of the prior art.

paste. As the paste was dried and then fired at 700° C. for 60 min., 2 ppm of nickel was diffused into the phosphor particle surface and the green colored surface area of cobalt oxide chemically combined on the particle surface. The amount of cobalt oxide contained in the surface area had a cobalt atom value of 0.04 wt% based on a phosphor particle of 100 wt%.

Using this green emitting phosphor, a color cathode ray tube was assembled and the characteristics were measured. The results obtained are presented in Table 4.

(Embodiment 11)

Except for the phosphor material and the amount of nickel sulfate, the phosphor of this embodiment was manufactured by the same method as Embodiment 10. The phosphor was ZnS:CuAuAl and the amount of nickel sulfate was $9.6 \times 10^{-4}$ wt%.

A phosphor screen using the green emitting phosphor was formed on the panel of a color cathode ray tube, and the characteristics were measured. The results are shown in Table 4.

(Embodiment 12)

Phosphor, 100 wt% of ZnS:CuAl, $3.24 \times 10^{-1}$ wt% of cobalt chloride, $CoCl_2.6H_2O$ were mixed with water in a slurry. Aqueous ammonia was added to the slurry for adjusting the pH to 8.5, and a layer of cobalt hydroxide and zinc hydroxide formed on the particle surfaces of the phosphor. Next, after washing and filtering, the phosphor was kneaded with $1.44 \times 10^{-3}$ wt% of nickel sulfate, $NiSO_4.7H_2O$ into a paste. The paste was dried and fired at 700° C. for 60 min., and green surface areas of (Co,Zn)O were formed on the surfaces of the phosphor particles.

The amount of cobalt oxide had a Co atom value of 0.08 wt% based on the phosphor particle of 100 wt%. Ni ions of 3 ppm also was contained on the phosphor particle. This phosphor was used together with a blue

TABLE 3

| | green emitting phosphor | amount of Co (wt %) | green brightness (relative value) | background brightness (relative value) | reflectivity (relative value) |
|---|---|---|---|---|---|
| comparison 1 | ZnS:CuAl | — | 100 | 100 | 100 |
| comparison 2 | ZnS:CuAl (Co dope) | 10 ppm | 95 | 85 | 100 |
| Embodiment 1 | ZnS:CuAl | 0.04 | 95 | 85 | 95 |
| Embodiment 2 | ZnS:CuAl | 0.005 | 99 | 96 | 98 |
| Embodiment 3 | ZnS:CuAl | 0.04 | 96 | 86 | 96 |
| Embodiment 4 | ZnS:CuAl | 0.04 | 94 | 82 | 96 |
| Embodiment 5 | ZnS:CuAl | 0.04 | 94 | 83 | 95 |
| Embodiment 6 | ZnS:CuAuAl | 0.05 | 100 | 95 | 99 |
| Embodiment 7 | ZnS:CuAl | 0.08 | 90 | 79 | 93 |
| Embodiment 8 | (Zn,Cd)S:CuAl | 0.41 | 80 | 68 | 91 |
| Embodiment 9 | ZnS:CuAl + $Y_2O_2S$:Tb | 0.04 | 97 | 84 | 95 |

In addition, further embodiments containing nickel in the phosphor particles now will be explained.

(Embodiment 10)

A slurry was made by mixing ZnS:CuAl phosphor of 100 wt% and cobalt chloride, $CoCl_2.6H_2O$, of $1.62 \times 10^{-1}$ wt%. Using aqueous ammonia for alkalization of the slurry and adjusting the pH value to 8.5, a phosphor covered with a cobalt hydroxide layer on the particle surface of the phosphor was obtained. Next, after washing and filtering, the phosphor was kneaded with nickel sulfate, $NiSO_4.7H_2O$ of $4.8 \times 10^{-4}$ wt% in a emitting phosphor, ZnS:Ag, and a red emitting phosphor, $Y_2O_2S$:Eu, for the phosphor screen. The characteristics of the color cathode ray tube using this screen were measured, and the results are presented in Table 4.

TABLE 4

| green emitting phosphor | amount of Co (wt %) | amount of Ni (ppm) | green brightness (relative value) | background brightness (relative value) | reflectivity (relative value) |
| --- | --- | --- | --- | --- | --- |
| Embodiment 10 (ZnS:CuAl) | 0.04 | 1 | 95 | 76 | 96 |
| Embodiment 11 (ZnS:CuAuAl) | 0.04 | 2 | 92 | 68 | 95 |
| Embodiment 12 (ZnS:CuAl) | 0.08 | 3 | 84 | 59 | 90 |

As indicated in Table 4 it was found that the characteristics of Embodiments 10 to 12 are superior as compared with the prior art.

According to the invention, a cathode ray tube with improved contrast and brightness is obtained.

We claim:

1. A cathode ray tube comprising at least one panel having a phosphor screen containing green emitting phosphor and an electron gun for generating an electron beam impinging to excite the phosphor screen, wherein the green emitting phosphor includes phosphor particles having a (Co, Zn)O compound chemically combined with the phosphor particles and on at least a portion of the surfaces thereof.

2. The cathode ray tube of claim 1, wherein the amount of CoO contained in the (Co,Zn)O is about 0.005 wt% to about 1.0 wt%, in terms of a Co atom, based on a particle of 100 wt%.

3. The cathode ray tube of claim 1, wherein the amount of CoO contained in the (Co,Zn)O is about 0.01 wt% to about 0.41 wt%, in terms of a Co atom, based on a particle of 100 wt%.

4. The cathode ray tube of claim 1, wherein the phosphor particle includes one compound selected from the group consisting of ZnS, ZnCdS, $Zn_2SiO_4$ and a mixture thereof, and has a (Co, Zn)O compound chemically combined with the phosphor particle and at least a portion of the surfaces thereof.

5. The cathode ray tube of claim 1, wherein the phosphor particle includes one compound selected from the group consisting of ZnS:CuAl, ZnS:CuAuAl, ZnS:CuCl, (Zn,Cd)S:CuAl, $Zn_2:SiO_4Mn$, $Zn_2SiO_4$:MnAs and a mixture thereof and has a (Co, Zn)O compound chemically combined with the phosphor particle and at least a portion of the surface thereof.

6. The cathode ray tube of claim 1, wherein the green emitting phosphor particle surface contains Ni ions.

7. The cathode ray tube of claim 6, wherein the amount of Ni ions in the phosphor particle surface is about 0.1 ppm to about 5.0 ppm.

8. The cathode ray tube of claim 6, wherein the amount of Ni ions on the phosphor particle surface is about 0.3 ppm to about 3.0 ppm.

9. The cathode ray tube of claim 6, wherein the phosphor particle includes a compound selected from the group consisting of ZnS:CuAl, ZnS:CuAuAl, (Zn,Cd)S:CuAl and a mixture thereof and has a (Co, Zn)O compound chemically combined with the phosphor particle and at least a portion of the surface thereof.

10. The cathode ray tube of claim 1, wherein the green emitting phosphor includes a mixture of a Zn type phosphor containing Zn in the phosphor particle and a non-Zn type phosphor free from Zn in the phosphor particle.

11. The cathode ray tube of claim 10, wherein the surface of the phosphor particle includes a (Co,Zn)O layer.

12. The cathode ray tube of claim 10, wherein the non-Zn type phosphor includes $Y_2O_2S$:Tb.

* * * * *